United States Patent Office 3,462,481
Patented Aug. 19, 1969

3,462,481
METHOD OF PRODUCTION OF
UNSATURATED ACIDS
David Moiseevich Rudkovsky and Naum Solomonovich
Imjanitov, Leningrad, U.S.S.R., assignors to Vsesojuzny
Nauchno-Issledovateljsky Institute Neftekhimicheskikh
Protsessov, Leningrad, U.S.S.R.
No Drawing. Filed Feb. 1, 1965, Ser. No. 429,608
Int. Cl. C07c 51/14; C07d 31/04, 33/16
U.S. Cl. 260—514                    4 Claims

ABSTRACT OF THE DISCLOSURE

A method for the production of unsaturated carboxylic acids from diolefins in which a cobalt carbonyl and a Lewis base are used to catalyze the reaction. The reaction is effected at temperatures of 100–300° C. and pressures above 20 atm.

---

The present invention relates to a method for the production of unsaturated acids, the said acids being intermediate products of various branches of the chemical industry, and more particularly, a raw material for the production of high-grade lubricants.

There exists a method of producing trans-3-pentenic acid by the reaction of butadiene with water and carbon monoxide in dimethylformamide in the presence of cobalt carbonyls. Also known is the reaction of hexadiene-1,5 with carbon monoxide and water in the presence of cobalt carbonyl resulting in the production of an unsaturated acid of 7 carbon atoms. The above methods possess the following disadvantages: the first method involves using high pressures (of the order of 3,000 atms.), and the second method results in a low yield of the desired product, i.e. it is unproductive.

An object of the present invention is to accomplish the synthesis of unsaturated acids by a new and more economic method.

A further object of the present invention is the accomplishment of the synthesis of unsaturated acids at relatively low pressures.

Another object of the present invention is an increased yield of the desired product, as compared with existing methods having compatible characteristics.

A principal object of the present invention is also an acceleration of the synthesis of unsaturated acids.

The present invention provides for the synthesis of unsaturated acids at temperatures of 100–300° C. and pressures exceeding 20 atms., and preferably, at temperatures of 140–210° C.; and pressures of 100–700 atms. further reduction of the pressure being unfavorable for the course of the reaction. The process also allows the use of higher pressures, this not being economically expedient at all times. The optimum temperature is dependent on the initial diolefin structure, as well as on reagent and admixture concentration.

Essentially the starting material used is either a conjugated (butadiene, piperylene, isoprene and their higher homologues) or non-conjugated (hexadiene-1,5) diolefins. Use is also made of acyclic, naphthenic, (vinylcyclohexene) and aromatic (divinylbenzene) diolefins including mixtures of the said (diolefins, and mixtures of the diolefins with monoolefins and saturated hydrocarbons.

In carrying out the process, advantage is gained by the use of solvents possessing good solvent ability both for water and for the diolefin used (acetone, dioxane). Under these conditions, there occurs no separation of the reacting composition or sharp retardation of the reaction resulting therefrom due to a decrease in diolefin concentration in the aqueous stratum and water concentration in the organic stratum.

The importance of the use of Lewis bases has been established in carrying out the above syntheses. The process is best carried out in the presence of pyridine, quinoline, or homologues thereof, although the use of compounds containing nucleophilic atoms and groups other than nitrogen in also effective.

The above substances may be introduced into the reacting composition either in the form of additives or used as solvents.

The catalyzers used for the process are metal carbonyls and complex compounds of metal carbonyls with substances of a base character, cobalt carbonyls and cobalt carbonyl complex compounds being of particular importance. Under the reaction conditions, all the above compounds are converted (with higher temperatures and pressures of carbon monoxide) into catalytically active carbonyls.

In the embodiment of one present invention, the diolefin concentration in the reacting composition may be varied within the range 0.5–30 percent, cobalt concentration 0.1–5 percent, aqueous concentration 5–40 percent. Carbon monoxide may be introduced into the reaction vessel in considerably larger amounts than the diolefin equivalent, and the unreacted gas may be recycled, the use being permitted of industrial gas mixtures containing carbon monoxide.

Since the carbonyl compounds complexed with the basic substances have an insignificant volatility (as a rule, lower than carbonyl volatility), under certain conditions, in distilling off the formed, unsaturated acid, these complex carbonyl compounds remain in the still and may be returned to the reaction vessel, thus being repeatedly re-used as catalyzers. It may also prove expedient, under certain conditions, to oxidize the carboxides to an ionic state and recover the obtained ionic metal by any one of the known methods.

A reaction by-product in the form of dicarboxylic acids is obtainable under certain conditions, said by-product having two carbon atoms more than the initial diolefin (resulting from interaction with carbon monoxide of the two diolefin double bonds). The dicarboxylic acids are a valuable byproduct, however, their yield may be reduced at will by decreasing the conversion degree of the initial diolefin.

The examples cited herein are an illustration of the present invention; however, the invention is not confined to the said examples and, as will be clear to those skilled in the art, the reactions described may be accomplished in a variety of ways within the spirit and scope thereof.

Example 1

6.9 g. butadiene, 10 cc. water, 4.7 g. dicobaltoctacarbonyl and 200 cc. pyridine were charged into a stainless steel autoclave to which was added carbon monoxide up to a pressure of 160 atms. The reacting mixture was then heated to a temperature of 160° C. and allowed to stand at this temperature for one hour, the vessel being shaken for better mixing. The acid value of the reacting mixture was 23; the bromine number 8.5. From the solution thus obtained, a fraction with a boiling point of 94–95.5° C. at a pressure of 17–18 mm. Hg was separated by distilling with a herringbone-type dephlegmator with subsequent rectification in vacuum. Determined, in percent: C, 60.08; H, 8.32; acid valve 539; bromine number 149. Estimated for pentenic acid $C_4H_7COOH$, in percent; C, 59.98; H, 8.05; acid value 560.4; bromine number 159.6.

The correspondence of the bromine number to the theoretic value is an indication that the derived pentenic acid contains a double bond not in the α,β position to the carboxyl group (α,β unsaturated acids combine poorly with bromine).

The Raman effect spectra have indicated the presence of trans-configuration and the absence of cis-configuration at double bond, as well as the absence of a double bond at the carbon chain end. The above data definitely establish that a trans-isomer 3-pentenic acid was obtained (yield approximately 70 percent of theoretical value).

Example 2

10 g. butadiene, 10 cc. water, 35 cc. pyridine, 175 cc. acetone 4.7 g. dicobaltoctacarbonyl were treated with carbon monoxide for a period of three hours at a temperature of 160° C. and a pressure of 210 atms., the yield of pentenic acid being about 60 percent according to the acid and bromine values of the product obtained.

Example 3

7 g. butadiene, 20 cc. water, 180 cc. quinoline, 3,5 g. dicobalt octacarbonyl were treated with carbon monoxide for a period of two hours at a temperature of 160° C.. and a pressure of 250 atms.

The product yield of the pentenic acid is approximately 50 percent according to the acid and bromine values.

Example 4

10 g. hexadiene-1.5, 20 cc. water, 5 g. dicobaltoctacarbonyl and 180 cc. of pyridine were charged in an autoclave, carbon monoxide being added thereto to build up pressure to 160 atms., the reacting mixture being subjected to shaking for a period of three hours at a temperature of 180° C. The product characteristics are as follows: acid value 30.2; bromine number 3.7. The product was then treated with atmospheric air with a view toward converting the carbonyl cobalt to the ionic state and, following the distilling of the pyridine, the product was subjected to shaking in a separatory funnel with benzene and 25 percent sulphuric acid (simultaneously). The ionic cobalt passes into the aqueous phase, and the unsaturated acid into the benzene phase, with the dicarboxylic acids (byproduct) being obtained in the form of a sediment. The dicarboxylic acids were separated by filtration and purified by crystallization from the aqueous solution. The heptenic acids were separated from the benzene solution by distilling in vacuum, the boiling point being 108–112° at a pressure of 12 mm. Hg. Redistillation has been carried out at 91–94° C. and 5 mm. Hg for analysis purposes.

Determined, in percent: C, 65.56; H, 9.88; acid value 416. Estimated for $C_6H_{11}COOH$, in percent: C, 65.59; H, 9.44; acid value 437, the heptenic acids yield being approximately 40 percent. $C_8$-dicarboxylic acids approximately 15 percent based on hexadiene.

What is claimed is:

1. A method for producing unsaturated acids, said method comprising reacting a mixture including a diolefin, carbon monoxide and water in the presence of pyridine or quinoline and a cobalt carbonyl at a temperature of 140–210° C. and a pressure of 100–700 atm., said diolefin, water and cobalt carbonyl being present in respective amounts of 0.5–30%, 5–40% and 0.1–5% by weight to form an unsaturated acid and separating said acid from the reaction mixture.

2. A method according to claim 1 wherein the pressure is 160–250 atm.

3. A method according to claim 1 wherein the diolefin is a congugated diolefin selected from the group consisting of butadiene, piperylene, and isoprene.

4. A method according to claim 1 wherein the diolefin is a non-conjugated diolefin selected from the group consisting of hexadiene-1,5 and vinylcyclohexene.

References Cited

UNITED STATES PATENTS

| 2,586,341 | 2/1952 | Hyson | 260—533 |
| 2,911,422 | 11/1959 | Ercoli | 260—537 X |
| 2,542,767 | 2/1951 | Gresham et al. | 260—410.9 X |

LORRAINE A. WEINBERGER, Primary Examiner

D. STENZEL, Assistant Examiner

U.S. Cl. X.R.

260—533